Patented Sept. 21, 1954

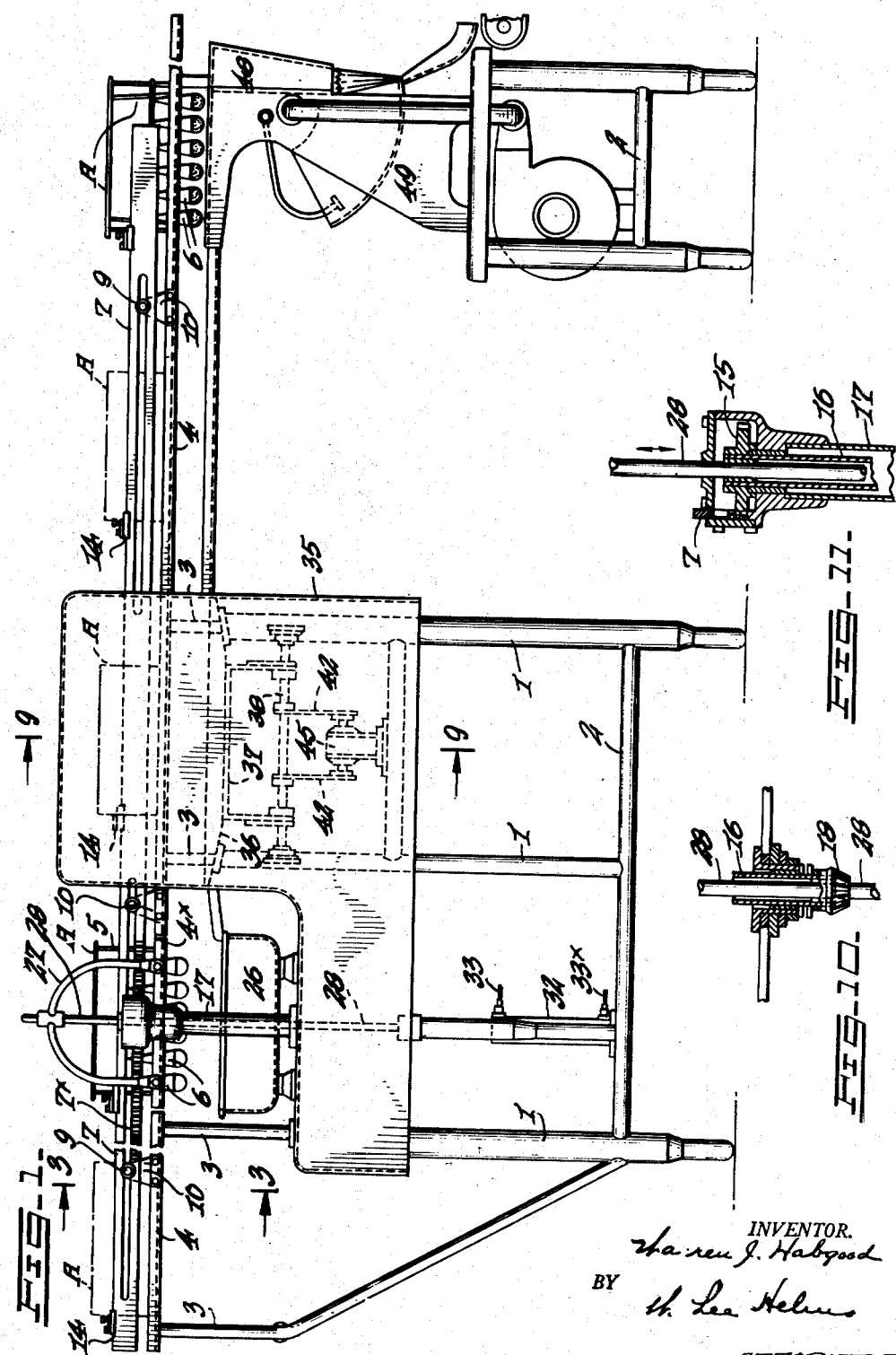

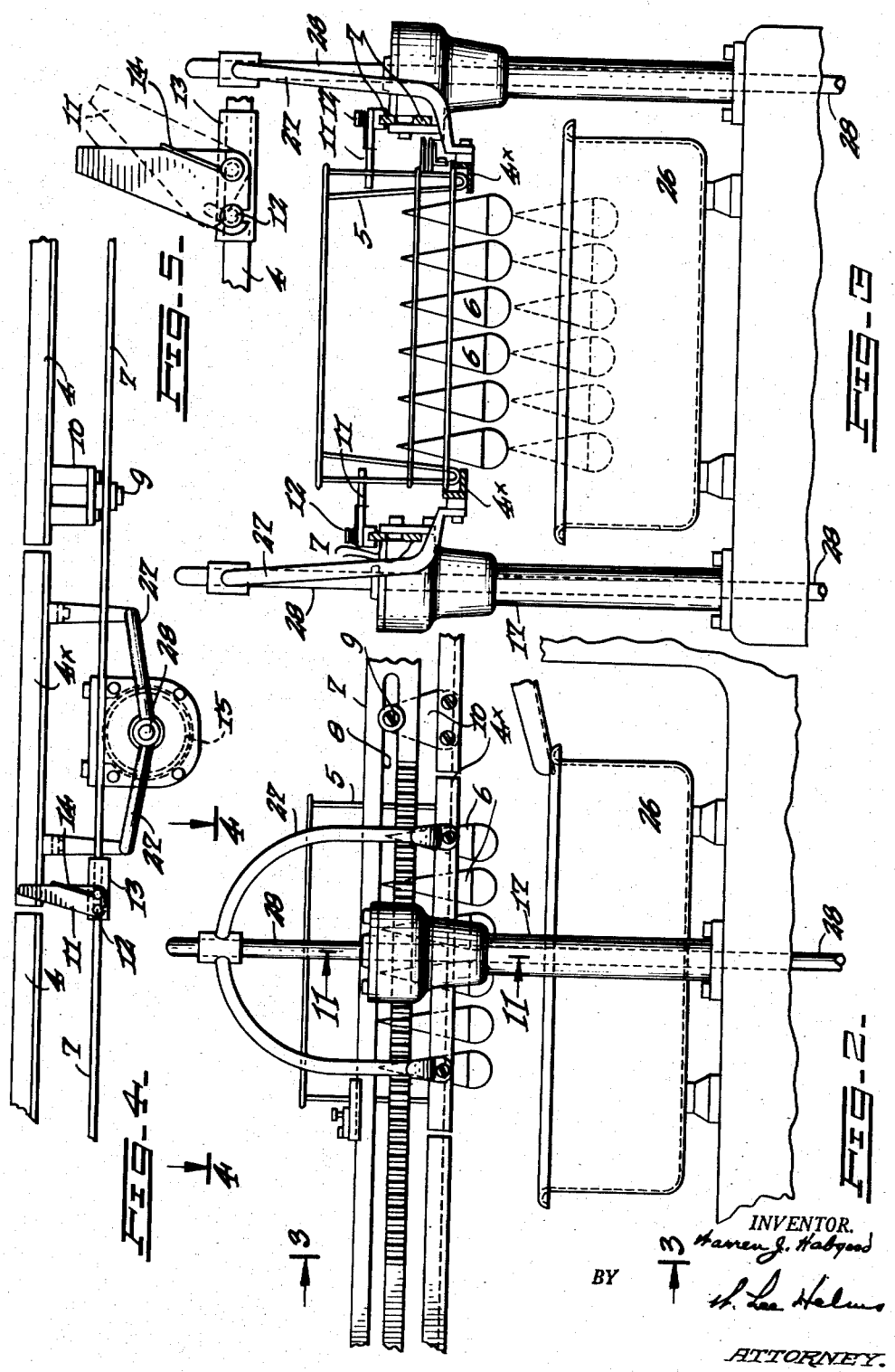

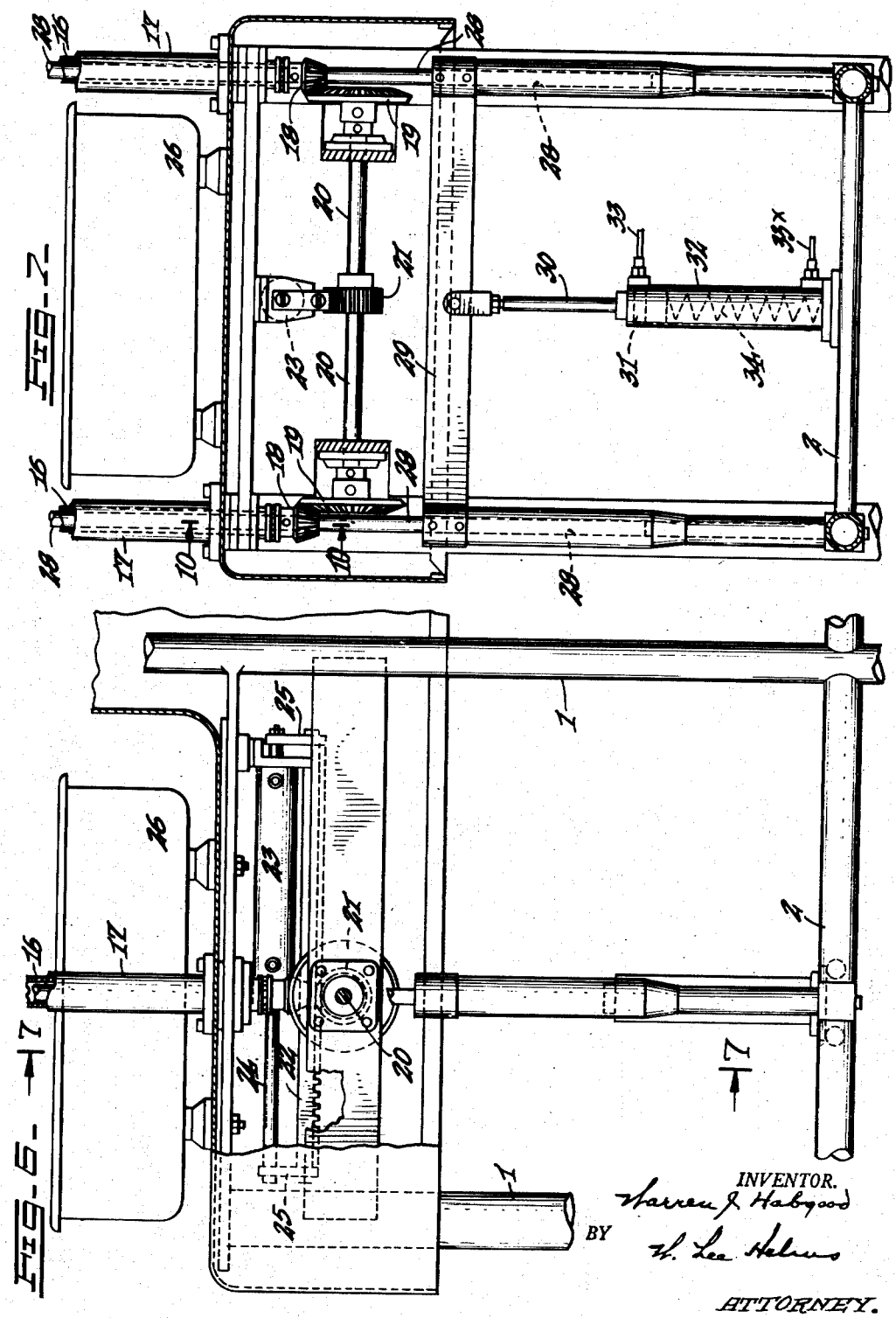

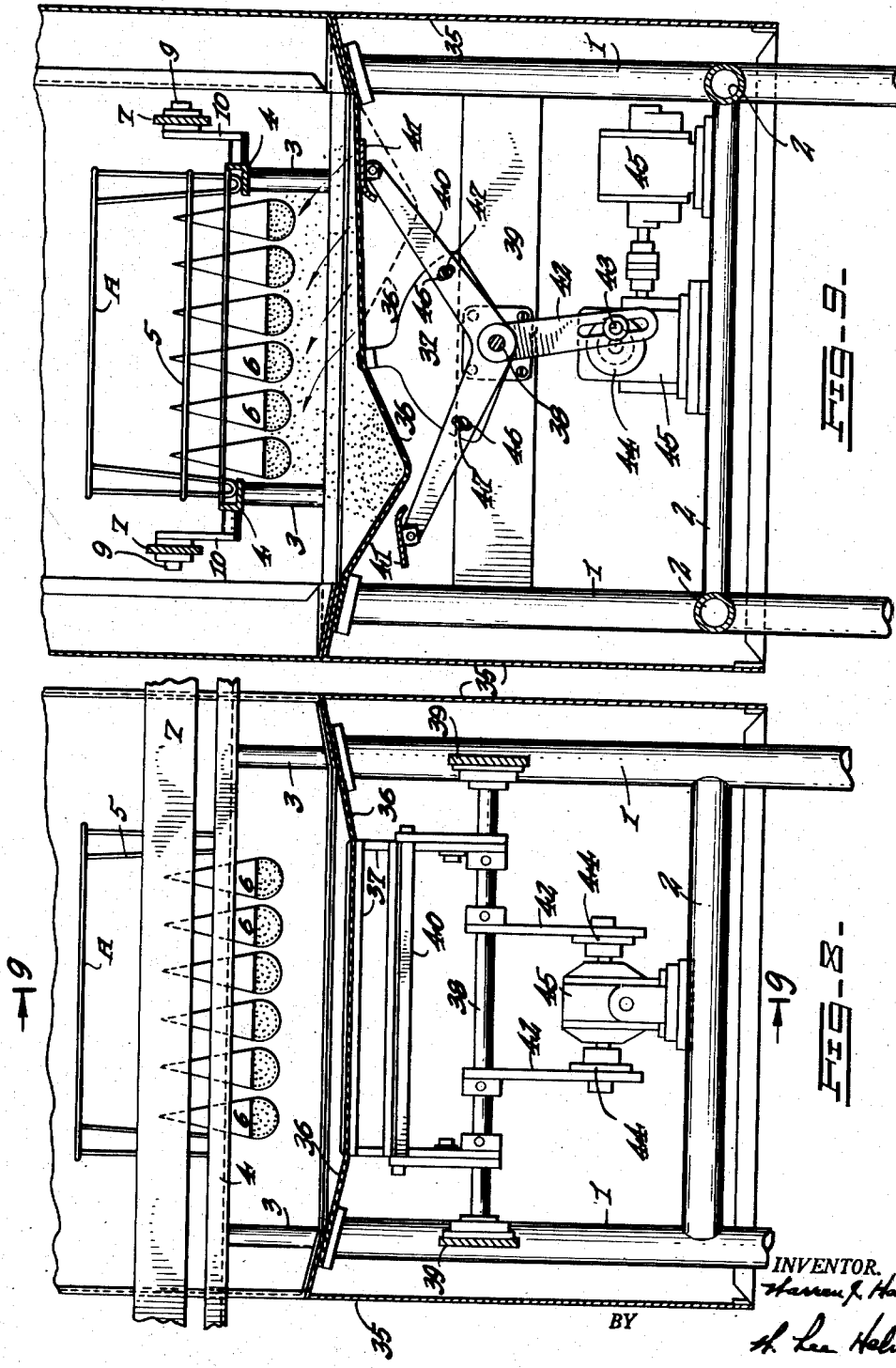

2,689,544

UNITED STATES PATENT OFFICE 2,689,544

APPARATUS FOR COATING ICE CREAM IN CONES

Warren J. Habgood, Upper Darby, Pa., assignor to Eskimo Pie Corporation, a corporation of Delaware Application December 15, 1950, Serial No. 200,887

2 Claims. (Cl. 118—24)

The present invention relates to the coating of ice cream in cones, the coating material usually being of chocolate followed by a coating material of granular nature, such, for example, as ground nuts, and the apparatus is directed to that type in which a rack holding thirty-six filled cones in inverted position is received upon a support and automatically moved into registration with two coating-application stations and thence to a bagging station at the discharge end of the machine.

The invention will be described with reference to the accompanying drawings, in which:

Fig. 1 is a view in elevation and showing an embodiment of the apparatus.

Fig. 2 is a side elevation showing the elements of the apparatus at the initial coating station.

Fig. 3 is a transfer sectional elevation taken on the line 3—3, Fig. 2.

Fig. 4 is a fragmentary and detailed plan view showing dipping elements illustrated in the preceding figure.

Fig. 5 is a detailed plan view with partly dotted lines showing two positions of one of the feed pawls for the racks.

Fig. 6 is an enlarged view, partly broken away, showing the table support for the dipping-fluid chamber and elements under the same and associated therewith.

Fig. 7 is a transverse sectional elevation taken along the line 7—7, Fig. 6.

Fig. 8 is a view of the elements at the station for the application of granular material to a rack holding the inverted cones.

Fig. 9 is a transverse section taken on the line 9—9, Fig. 8.

Fig. 10 is a fragmentary vertical section on the line 10—10, Fig. 7.

Fig. 11 is a vertical detailed section on the line 11—11, Fig. 4.

Referring to Fig. 1, it will be seen that the apparatus comprises a primary supporting frame having the upright standards 1 and suitable horizontal struts 2. The plurality of vertical bracket arms 3 support the spaced elements 4 of a track upon which any suitable form of rack 5 may be moved. The rack holds a plurality of rows of cones filled with ice cream or the like, usually thirty-six cones, in inverted position, these cones being indicated at 6. At each side of the apparatus is a reciprocating feed bar 7, the form of which is best shown in Fig. 2. Each bar is formed with a plurality of longitudinal slots into which are projected a plurality of supporting studs or rollers 9 carried by vertical brackets 10, secured, as to each side of the machine, to the underlying trackway 4. The feed bar and its supporting and drive mechanism have the same construction at each side of the machine so that the following description of one will suffice for both.

Referring to Figs. 1 and 5, the feed bar 7 carries at its top a plurality of feed pawls for the racks, the construction being detailed in Fig. 5. Each pawl consists of an arm 11 formed with a curved slot into which enters a guide stud 12 carried by a plate 13 secured to the appropriate track member 4. A light spring 14 normally holds the pawl in the full line position, Fig. 5, but enables rearward movement of the pawl to the dotted line position.

The feed bar 7, Fig. 1, is provided with a portion at 7x having rack teeth engaged by a ratchet wheel 15, Fig. 11, the latter being carried by a tubular shaft 16 within a vertical tubular housing 17, Fig. 11. As shown in Fig. 7, tubular shaft 16 carries a gear 18 in mesh with a drive gear 19 on horizontal shaft 20. At the opposite side of the machine, shaft 20 carries corresponding elements for the drive of the feed bar for operating the second feed bar. Shaft 20 carries a driven gear 21 rotated by ratchet 22, Fig. 6, which ratchet in the present embodiment, is reciprocated by an air motor 23. The piston 24 of the air motor carries ratchet 22 by means of depending bracket arms 25.

When a rack holding cones filled with ice cream or the like is placed in the dotted line position A, Fig. 1, the feed bar in its forward initial movement will carry the rack to the full line position over the dipping tank 26, Fig. 1. During the reverse movement of the feed bar 7, which is an idle movement, a section of the trackway, indicated at 4x, will be lowered to bring the ends of the cones into a liquid held by tank 26. To this end, the opposed track elements forming track section 4x are carried by yoke members 27, one at each side of the machine. Each yoke member is carried by a vertical shaft 28, extending downwardly through tubular shaft 16 and gear 18 and into one of the hollow standards 1. Shafts 28 are secured to a cross-bar 29 engaged by piston rod 30. At the lower end of the piston rod is piston 31 within a cylinder 32 which receives compressed air via pipes 33 and 33x for up and down motion of the piston. Therefore, when the rack, holding filled cones, reaches the dipping station, and as the feed bars are moving back to initial position and are idle, air will be admitted to cylinder 32 above the piston 31 and the piston will be moved downward against the tension of a spring 34, causing the track section 4x, with the rack held thereby, to be lowered until the exposed ice cream or allied material held by the cones is immersed into the liquid. This liquid may be molten chocolate composition or any other edible composition which will have somewhat adhesive characteristics for the period of time required in the transfer of the confections to the station at which the granular edible material is applied to the coating.

When the ice cream or allied material is coated, the liquid-coating valve devices (not shown) will cause the return of the piston and piston rod 30, raising the track section to its position as shown in Fig. 1. Immediately there will be a second forward motion of the feed bars, a second pair of pivoted pawls having slipped past the rack on the return stroke of the feed bars and the forward motion of the feed bars will carry the rack and the elements carried thereby to the station for application of the granular material. Figs. 8 and 9 show the said station.

At the station where the granular material is applied, a casing 35, open at its ends to receive the trackway and the rack carried thereby, with associated elements, is provided. The casing is closed at its bottom by a flexible blanket 36. This blanket is gripped transversely at its center by the upper end of a rocker 37. On a shaft 38 carried by spaced cross-bars 39 is a supplemental rocker 40 having two arms at the outer ends of which are plates 41, the rocker being of V shape. Lever arms 42 are carried by shaft 38 and the lever arms are slotted at their lower end to receive drive-studs 43 eccentrically carried by rotary disks 44 driven by motor 45. Each arm of rocker 40 is formed with an elongated slot 46 to receive a headed screw 47 which will enable limited movement of rocker 40 relatively to rocker 37. Rocker 37 is fixed to shaft 38. Therefore the rocking motion imparted to shaft 38 causes rocker 37 to move the flexible blanket from the full line position, Fig. 9, to the dotted line position of that figure, so that the granular material will be thrown from side to side and upwardly so as to adequately coat the ice cream or allied product through the adhesive nature of the initial coating material. The margins of the blanket are suitably clamped in position as indicated in Figs. 8 and 9.

The application of the granular coating material is effected during an idle or return movement of the feed bar 7. It is concluded at the end of said idle movement and at the time when a third pair of pivoted pawls 11 slip past the rack in casing 35 and lie in position to carry the rack out of casing 35 on the next active movement of the feed bars. By successive movements, the rack A is carried first to the right-hand dotted line position of Fig. 1 and thence to the full line position of that figure. In the next active movement of the feed bars the rows of confection will in succession be brought into register with the receiving trough 48 of a suitable bagging machine 49, indicated at 49, and means not forming part of the present invention will be provided for releasing the cone confections from the rack, so that the rolls will successively be discharged into bags automatically fed into receiving position. The empty rack will then be removed.

Having described my invention, what I claim and desire to secure by letters patent, is as follows:

1. A blanket coater for throwing upwardly edible granular material to a suspended depending frozen confection comprising means for holding said confection suspended in a depending manner, a substantially planar flexible blanket disposed suspendingly at a pair of opposed ends beneath said dependingly held frozen confection, means for transversely gripping said blanket at substantially its center, a first centrally fulcrumed rocker having a vertical tongue adapted to engage the transverse gripping means, a second centrally fulcrumed V-shaped rocker having upright outstretched arms having movable plates thereon said plates being adapted to alternately engage the blanket in spaced relation to said gripper, a pivot bar connecting the pivots of said first rocker and said second rocker, and eccentric means for oscillating said pivot bar whereby said blanket is planarly and alternately hit by the movable plates disposed on said arms of said second rocker to throw upwardly the granular edibles thereon into adhesive engagement with said frozen confection.

2. The apparatus of claim 1 wherein each of the arms of said second rocker is provided with a slot and said first rocker is fixed to said pivot bar, said first rocker being further provided with studs disposed in said slots of said second rocker, whereby the second rocker is given an extended limited oscillatory movement relative to that of the first rocker.

References Cited in the file of this patent

UNITED STATES PATENTS

| Number | Name | Date |
|---|---|---|
| 1,132,895 | Woolf | Mar. 23, 1915 |
| 1,166,071 | Mettler et al. | Dec. 28, 1915 |
| 1,166,240 | Momenee | Dec. 28, 1915 |
| 1,294,946 | Pupilla | Feb. 18, 1919 |
| 1,908,539 | Quick | May 9, 1933 |
| 1,910,536 | Guggenheim | May 23, 1933 |
| 1,960,339 | Howard | May 29, 1934 |
| 2,115,969 | Truesdell | May 3, 1938 |
| 2,300,396 | Bookidis | Nov. 3, 1942 |
| 2,335,118 | Hauser et al. | Nov. 23, 1943 |
| 2,339,437 | Taylor | Jan. 18, 1944 |
| 2,347,164 | Petrilli | Apr. 18, 1944 |
| 2,551,849 | Petrilli | May 8, 1951 |